Oct. 12, 1965        BO N. HOFFSTROM        3,211,262
PLANETARY STOP MECHANISM WITH TORQUE OVERLOAD RELEASE
Filed April 20, 1961                    4 Sheets-Sheet 3

INVENTOR
Bo. N. Hoffstrom

BY *Strauch, Nolan & Neale*

ATTORNEYS

Oct. 12, 1965   BO N. HOFFSTROM   3,211,262
PLANETARY STOP MECHANISM WITH TORQUE OVERLOAD RELEASE
Filed April 20, 1961                          4 Sheets-Sheet 4
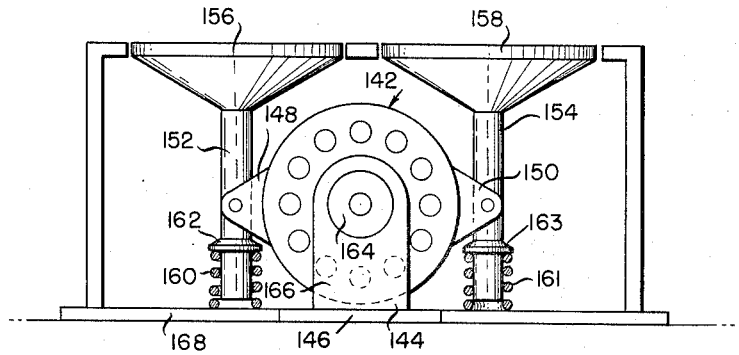
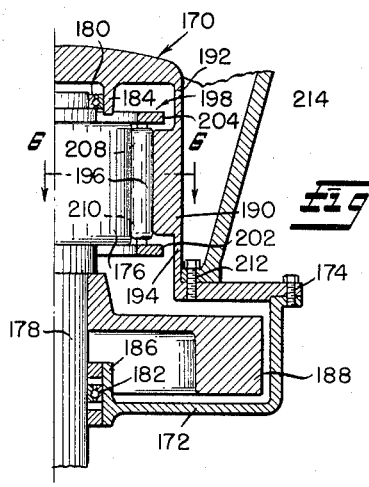
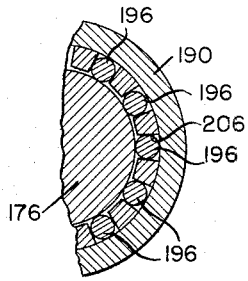
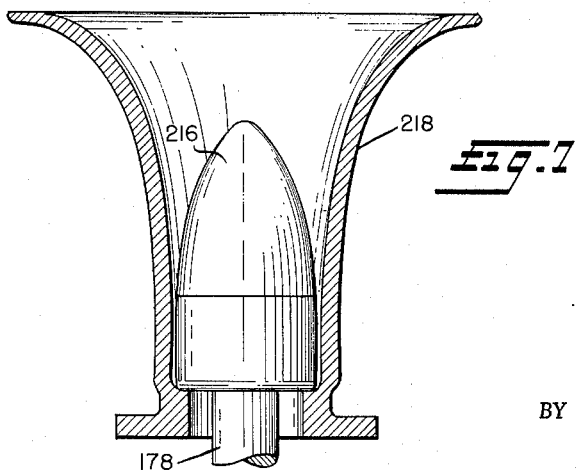
INVENTOR
Bo N. Hoffstrom
BY
ATTORNEY

United States Patent Office 3,211,262
Patented Oct. 12, 1965

3,211,262
PLANETARY STOP MECHANISM WITH
TORQUE OVERLOAD RELEASE
Bo N. Hoffstrom, Santa Monica, Calif., assignor to
Douglas Aircraft Company, Inc., Santa Monica, Calif.
Filed Apr. 20, 1961, Ser. No. 104,353
2 Claims. (Cl. 188—136)

This invention relates to rotary planetary mechanisms effective to receive input energy or to transmit the input energy to another portion of the system in which they are placed.

In one form the invention functions to selectively prevent rotation of an input shaft or to permit its free rotation, depending upon the torque applied to the shaft. In another form, the invention functions as a device for transforming the rotary energy applied to the drive shaft to vibratory motion which may be utilized to actuate a variety of devices such as a shaker table or to produce wave motion in a surrounding fluid medium, for example to generate sound or to operate an ultrasonic cleaner.

It is the principal purpose and object of the present invention to provide novel planetary mechanisms which are of simple, rugged construction and which have an extraordinarily broad field of utility and application.

It is a further object of the present invention to provide a novel planetary stop mechanism which is automatically released by the application of input energy above a predetermined level.

It is also an object of the present invention to provide novel ultrasonic cleaners incorporating as a principal component the improved planetary mechanism of the present invention.

It is an additional object of the present invention to provide novel sound generators also incorporating the improved planetary mechanism of the present invention.

It is a further object of the present invention to provide improved rotary planetary devices effective to transform rotary input energy into vibratory motion with an efficiency considerably higher than heretofore obtainable in the art.

In its basic form the present invention comprises a gearless planetary mechanical system including an inner sun ring, a number of planets carried by a spider or cage, and an outer ring surrounding the planets. The planets and the inner and outer ring members are all provided with smooth drive surfaces and accordingly may be termed "toothless gears."

The inner surface of the outer ring, which is engaged by the planets, is provided with a series of cam surfaces. Since the planet members and the inner sun members are of cylindrical form, the annular channel traversed by the planet members is of varying radial dimension. Thus, when the sun member is driven, thus rotating or tending to rotate the planet gears and the spider or cage which carries them, the planets, as they engage the cam surfaces, exert a force on the outer ring gear which has a circumferential component and a radial component. Either the radial component or the circumferential component of force acting on the outer ring may be used effectively depending upon the apparatus with which the planetary mechanism is associated.

For example, in certain cases the mechanism is so constructed that the outer ring is held against rotation and the circumferential component of force, which may be expressed in terms of torque, exceeds the torque applied to the sun member. Under these conditions rotary motion of the input sun member is stopped. When the input torque is increased, the planet gears move over the cam lobes and the input member may be permitted to run free. Thus in this form, the mechanism acts as a stop mechanism which is automatically released by the application of input torque above a predetermined level.

In cases where the input torque is maintained at a constant level above that necessary to move the planet gears over the cam lobes on the outer ring, the mechanism acts as a variable torque transmitting device to produce rotary oscillation in the outer ring member which may be utilized as a drive mechanism for a shaker table, a vibratory feed mechanism or in other applications where the production of a high speed oscillating motion is desirable.

The radial component of force developed in the mechanism may be utilized effectively by restraining all circumferential motion of the outer ring member. In this case, high frequency radial motion will be induced in the outer ring member which may be transmitted to a surrounding fluid medium to produce wave motion of a predetermined character in this medium, for example to operate an ultrasonic cleaner or to produce sound.

Additional objects and advantages of the present invention will become apparent as the description proceeds in connection with the accompanying drawings in which:

FIGURE 4 is a front elevation of the apparatus as incorporated in a shaker table drive mechanism;

FIGURE 5 is a vertical section through an ultrasonic cleaner unit embodying the drive mechanism of the present invention;

FIGURE 6 is a transverse section taken along line 6—6 of FIGURE 5; and

FIGURE 7 is a central vertical section of a sound generator embodying the novel planetary mechanism of the present invention.

Figure 1:
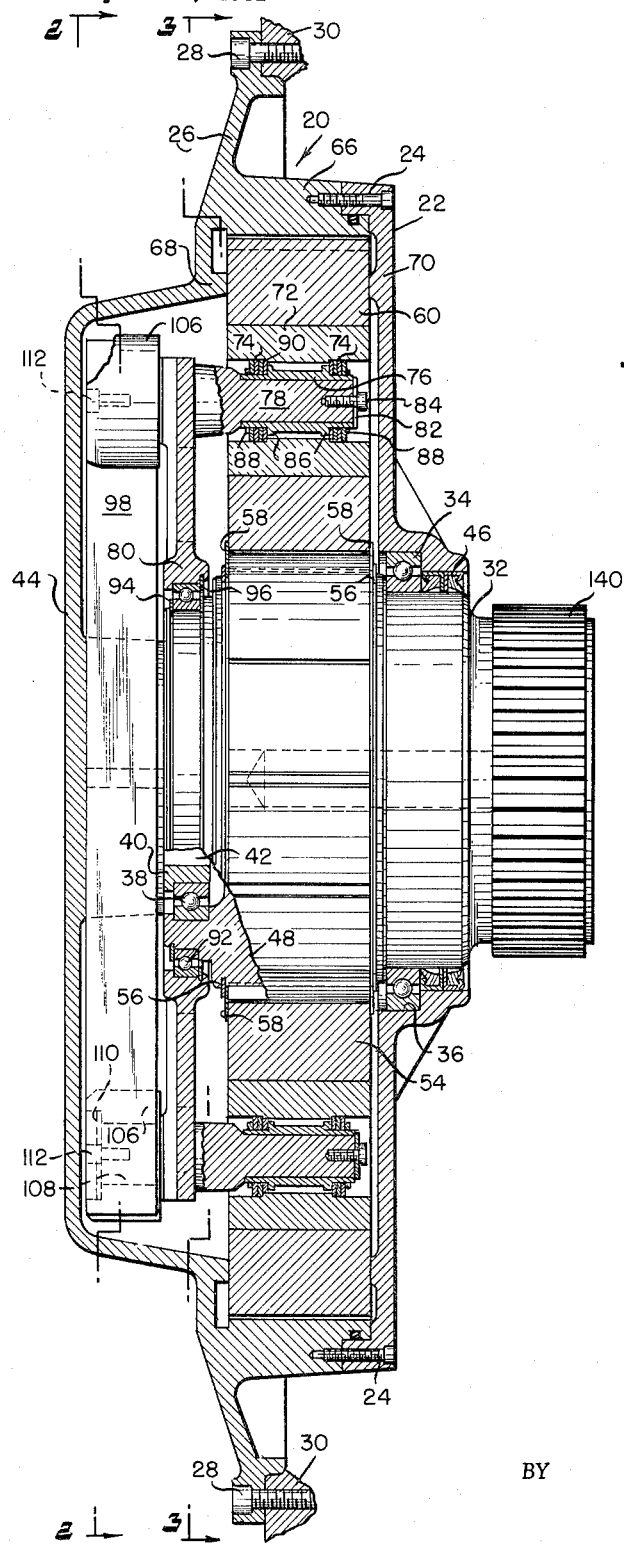
FIGURE 1 is a transverse section of the apparatus of the present invention in one of its basic forms.
Figure 2:
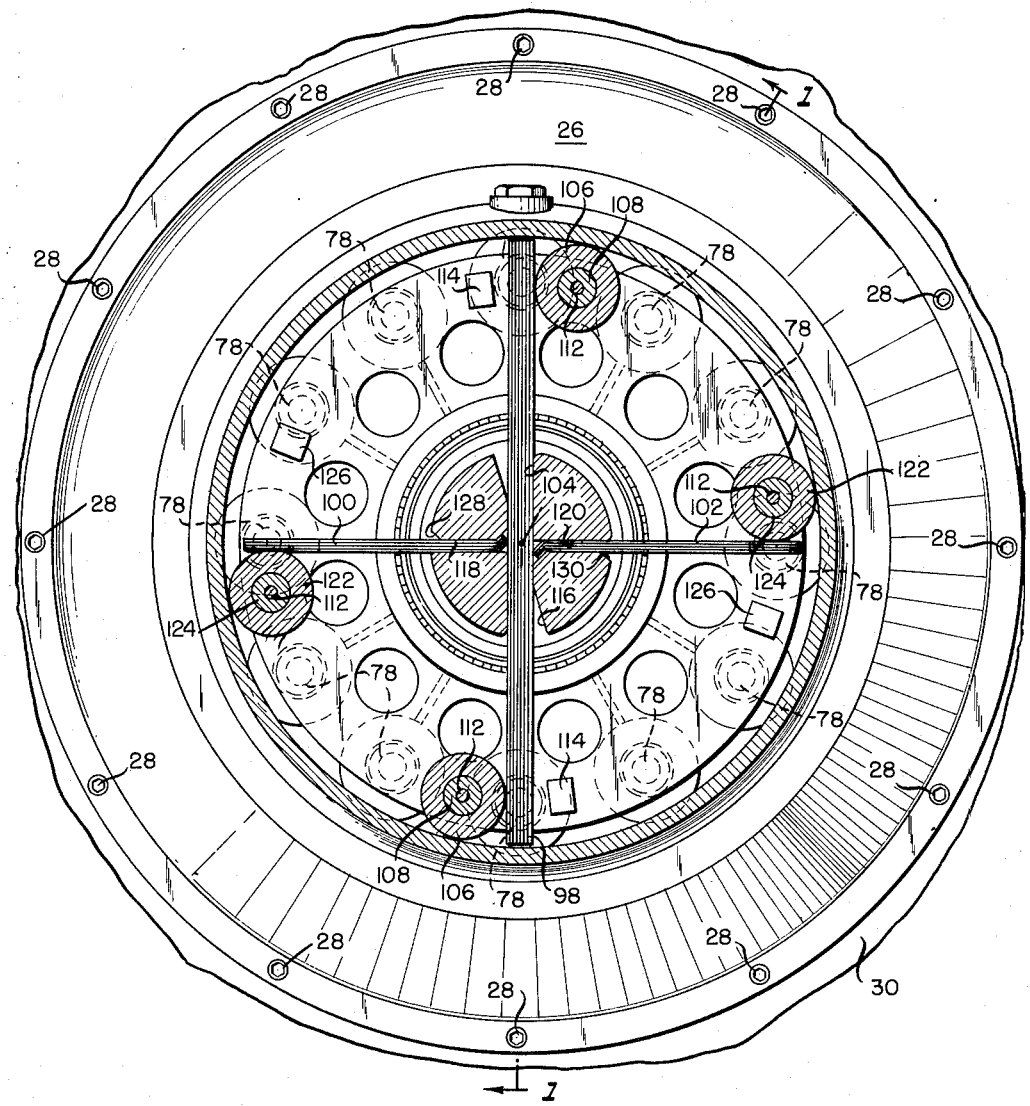
FIGURE 2 is a section taken along line 2—2 of FIGURE 1 showing details of a mechanism for variably restricting the rotary movement of the spider carrying the planet members.
Figure 3:
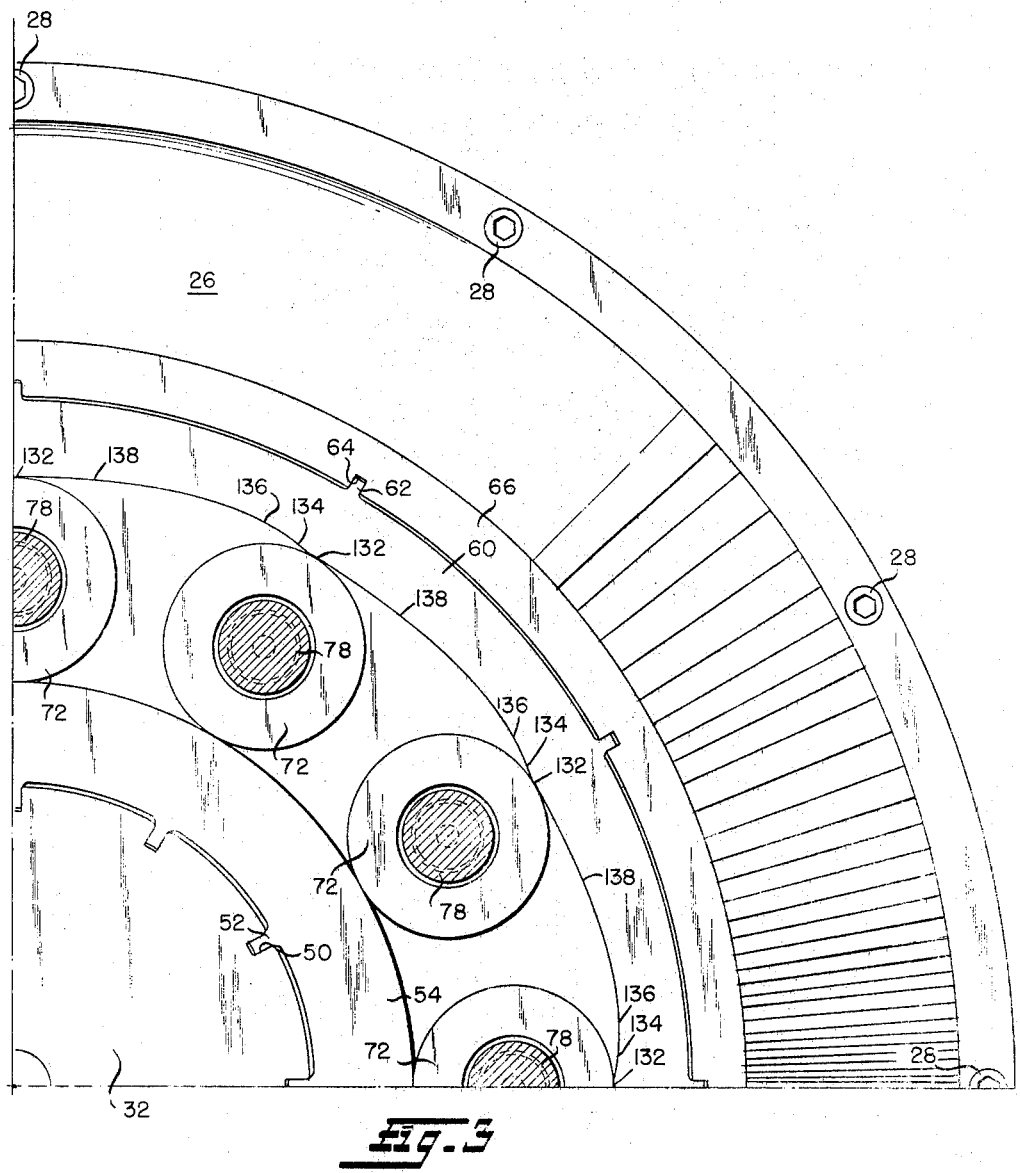
FIGURE 3 is an enlarged fragmentary section taken along line 3—3 of FIGURE 1 showing the configuration of the cam surfaces on the outer ring member.

Referring now more particularly to the drawings, in the form of the invention shown in FIGURES 1, 2 and 3, the planetary mechanism is enclosed within dish-shaped housing member indicated generally at 20 closed by a plate-like cover member 22 detachably secured to the main housing member 20 by a plurality of bolts 24. A circumferential flange 26 of the main housing member 20 is secured by a plurality of bolts 28 to any suitable support assembly 30 at which has sufficient rigidity and mass to prevent rotary or oscillating motion of the housing 20.

A relatively heavy input shaft 32 is mounted for rotation coaxially of the housing member 20 on a front bearing assembly 34 carried in a central opening 36 in the cover plate 22 and a rear bearing assembly 38 supported on a mounting ring 40 press-fitted or otherwise suitably mounted on a boss 42 formed integrally with the bottom wall 44 of the housing member 20. A suitable sealing mechanism 46 is provided adjacent the outer bearing 34 to prevent the entry of dirt and other foreign matter. The enlarged central hub portion 48 of the shaft 32 is provided with a plurality of radial notches 50 into which slidably extend tongue members 52 formed integrally with the inner periphery of the sun ring 54. It will be noted that there is a slight annular clearance between the outer periphery of the hub portion 48 and the inner periphery of the sun ring 54. This clearance, coupled with the tongue and notch connection between the two members, permits the sun ring 54 to flex radially to some extent in operation and to center itself automatically with respect to the remainder of the mechanism.

The sun member 54 is held in axial position on the hub 48 by locking rings 56 carried by the hub member and bearing against wear rings 58 which engage the side surfaces of the adjacent portions of the hub and ring.

The outer ring member 60 is provided with a plurality of radially projecting tongues 62 which are slidably received in corresponding notches 64 in the circumferential wall portion 66 of the main housing member 20. Again, a slight radial clearance is provided between the outer surface of the ring member 60 and the inner surface of the housing wall 66 to permit radial flexing of the ring 60 and to permit the ring to become centered automatically around the axis of the input shaft 32. The ring 60 is held against axial motion by ridges 68 and 70 projecting from the bottom wall 44 of the housing 20 and the inner surface of the cover plate 22, respectively.

The planets are of identical construction, each of the planets 72 being of hollow cylindrical form and being rotatably mounted at equally circumferential spaced locations around the axis of the input shaft 32 on resilient discs 74 carried by a collar 76 journalled on a stub shaft 78 formed integrally with a spider 80. The collars 76 are retained on the shaft 78 by end plates 82 secured to the shafts by bolts 84. The stacks of resilient rings 74 are held against shoulders 86 on the collars 76 by lock rings 88. Annular shoulders 90 on the inner periphery of the planet ring 72 are engaged by the outer periphery of the stacks of resilient rings 74 to prevent excessive axial play of the planets. The resilient mounting of the planets is an important feature of the invention for reasons discussed in detail below.

The hub of the spider 80 is supported on a bearing assembly 92 carried by an extension of the input shaft 32, the bearing being held against shoulders in the respective members by locking rings 94 and 96. In this form of the invention, the spider 80 is resiliently restrained against free rotation and is biased toward a predetermined angular position. This is accomplished by oppositely acting sets of leaf springs 98, 100 and 102. The springs 98 extend diametrically across the apparatus through a slot 104 formed in the housing boss 42. The outer ends of the springs bear against a pair of symmetrically positioned rollers 106 which are journalled on stub shafts 108 formed integrally with spider 80 and held in place by end plates 110 attached to the stub shafts 108 by screws 112. Because of the relative positioning of the springs and the rollers 106, the springs 98 are effective to yieldably oppose rotation of the spider in a counterclockwise direction as viewed in FIGURE 2. Rotation of the spider in this direction is positively limited by a pair of symmetrically opposite stops 114 formed integrally with the housing 20 and projecting into the path of the ends of the springs 98. The outer ends of the slot 104 are cut away at 116 to permit the necessary deflection of the spring 98.

The relatively light sets of springs 100 and 102 extend through radial slots 118 and 120 in the housing boss 42 and their inner ends are bent as shown to retain them in place. The outer ends of the springs 100 and 102 bear against a pair of symmetrically opposite rollers 122 journalled on stub shafts 124 projecting from the spider 80 in the same manner as the rollers 106. The spring sets 100 and 102 are effective to resiliently oppose motion of the spider in clockwise direction as viewed in FIGURE 2, the limit of motion in this direction being determined by stops 126 carried by the housing 20 and projecting into the path of the springs 100 and 102 as they are deflected. Again, the outer ends of slots 118 and 120 are cut away as at 128 and 130 to facilitate deflection of the springs.

As best shown in FIGURE 3, the inner surface of the outer ring 60 is provided with a plurality of cams, the cams being the same in number and having the same circumferential spacing as the planets 72. In the example shown, 12 cams are employed, each having the same circumferential length of 30°. Each cam comprises a peak 132, a steep cam rise 134, a dwell portion 136 and a shallow rise section 138. The height of the peak 132 has been exaggerated for purposes of illustration. In a typical case the shallow rise section has an angular extent of 22°, the dwell extends 5° and the steep rise extends 3° along the inner circumference of the ring 60. The sets of springs are so arranged with respect to the cam surfaces that the former are unloaded as shown in FIGURE 2 when the planets are in engagement with the cam peaks 132 as shown in FIGURE 3. The heavy springs 98 are deflected in a counterclockwise direction from the position shown in FIGURE 2 and the relatively light springs 100 and 102 are deflected when the planets are moved in the opposite direction. Further, the stops 114 and 126 are so positioned that the planets may be circumferentially shifted in either direction from the position shown until they are opposite the dwell portion of the cam in which location the planets run free between the sun ring 54 and the outer ring 60.

One application in which the form of the invention thus far described has found particular utility is in connection with an arresting system for aircraft. Such a system comprises a web of material such as nylon stretched across the runway in the path of the aircraft, the opposite ends of the web being coiled on rotatable drums which are connected to braking devices which permit the tape or web to be uncoiled at a controlled rate when the web is engaged by the aircraft. After the aircraft has been brought to a stop, the tape is retrieved and stretched taut across the runway and held in this position with a substantial degree of tension. When the tape or web is subsequently engaged by the aircraft, the drums on which the tape is coiled must be immediately released for substantially free rotation. It has been found that the apparatus of the present invention is ideally suited for holding the drums on which the tapes are coiled to maintain the desired degree of tension in the web while permitting their quick release and subsequent free rotation. A complete system of this type is disclosed and claimed in application Serial No. 829,071 filed July 23, 1959, for Power Absorbing Systems and Components. The planetary system thus far described may be incorporated in the arresting system by connecting the splined section 140 on the input shaft to one of the drums on which the tape is coiled.

In considering the operation of the system, let it be assumed that the tape is being held under the desired degree of pre-tension. Under these conditions, the planets 72 will be displaced in a counterclockwise direction from the cam peaks 132 as viewed in FIGURE 3. The planets will be held in firm engagement with the steep cam rise section 134 because of the applied torque on the input shaft 32 which acts in a clockwise direction as viewed in FIGURE 3. Also, because of the resilient mounting of each of the planets, they will each be in contact with the same portion of the cam rise despite possible manufacturing inaccuracies in the spacing of the cam sections or in the spacing of the stub shafts 78 on which the planets are mounted. By virtue of this construction, the total load will be distributed equally between the planets and the cam surfaces. The cam peaks and the cam rises are so proportioned that the torque applied to the shaft 32 when the tape is under the desired degree of tension is not sufficient to move the planets past the cam peaks. Accordingly, the apparatus will remain at rest in this position indefinitely.

However when the tape is engaged by the aircraft, the torque applied to the shaft 32 rises substantially instantaneously to a value much higher than that required to move the planets over the cam peaks 132. Accordingly the spider is shifted circumferentially in a clockwise direction as viewed in FIGURES 2 and 3, the clockwise movement continuing until the planets reach the next adjacent dwell portion 136. Overtravel of the spider is prevented by the stops 126 and the deflection of the spring sets 100 and 102. Accordingly, the planets reach an equilibrium position where they begin to slip between the sun member 54 and the outer ring 60 and continue to urge the spider in a clockwise direction with a torque which is just matched by the relatively light springs 100 and 102. Under these conditions the shaft 32 is capable of substantially free rotation. This position of the parts is maintained until the aircraft completes its runout at which time the drum and the input shaft 32 come to rest. To retrieve the tape, the drums are rotated in the opposite direction by a suitable motor. Consequently the shaft 32 is rotated in a counterclockwise rotation. Since the springs 100 and 102 urge the planets into engagement with the sun ring 54 and the shallow cam rise 138, the planets and the spider are immediately shifted bodily in a counterclockwise direction as viewed in FIGURE 3 and this motion is continued until the planets pass the cam peaks 132 and come to rest in the dwells 136 at the opposite sides of the cam peaks 132. Overtravel in this direction is prevented by the stops 114 and the deflection of the spring 98 which holds the parts in an equilibrium position in which the shaft 32 is freely rotatable in a counterclockwise direction. This motion continues until the tapes are fully wound on the coils at which time the motor which drives the coils stalls and is shut off. At this moment, the tension in the tapes rotates the shaft 32 in a clockwise direction which tends to pull the planets up the steep rise section 134 toward the cam peak 132. However as stated above, the torque applied by the tape is insufficient to move the planets past the cam peaks and the mechanism again comes to rest. It is to be noted that because of the utilization of the steep and shallow cam rises the unlocking force is many times higher than the resetting force. This avoids the imposition of undue torque loads on the motor apparatus which drives the drums in a retrieve direction. It is also to be noted that the resetting force is encountered before the tape is tensioned and when the load on the retrieve motor is relatively light.

As stated above, the planetary mechanism of the present invention has many other diverse applications. One of these is a shaker table drive mechanism as shown in FIGURE 4 to which detailed reference will now be made. In this form the planetary drive system indicated generally at 142 is identical with the previously described unit except that the cam surfaces on the outer ring are formed symmetrically about the opposite sides of the cam peak and a relatively shallow cam rise is employed. The springs 98, 100 and 102 are omitted to permit free rotation of the spider.

The planetary drive mechanism 142 is preferably mounted for rotation about a fixed axis on a stand 144 supported by a suitable rigid base plate 146. Oppositely extending ears 148 and 150 formed integrally with the housing of the planetary mechanism 142 are pivotally secured to arms 152 and 154, respectively, depending from shaker tables 156 and 158. The planetary drive mechanism 142 and the shaker tables 156 and 158 are normally maintained in the position shown by springs 160 and 161 coiled between shoulders 162 and 163 on the respective arms 152 and 154 and the base plate 146. Rotation of the planetary mechanism 142 away from this neutral position is limited by contact of the lower ends of the arms 152 and 154 with the base plate 146, the clearance at these points being selected to suit the requirements of the particular installation. The mechanism may be driven by any suitable source of power (not shown) drivingly connected to the input shaft 164 of the planetary drive mechanism 142.

Upon rotation of the shaft 164, for example in a clockwise direction, the planets individually begin to rotate in a counterclockwise direction carrying the spider in a clockwise direction and tending to carry the housing of the mechanism 142 in a clockwise direction as the planets pass upwardly along the cam rises. Thus the housing is rotated slightly in a clockwise direction lowering the shaker table 158 and raising the shaker table 156. When the mechanism is being started, the motion continues until the lower end of the arm 154 contacts the base plate 146. Continued rotation of the drive shaft causes the planets to pass over the peaks of the cams tending to accelerate travel of the spider in a clockwise direction, the reaction rotating the housing of the mechanism 142 in the opposite direction thus raising the shaker table 158 and lowering the shaker table 156. In the continued rotation of the drive shaft 164, the mechanism 142 oscillates with a frequency which is a function of the speed of the drive shaft, the number of planets and the number of cam surfaces employed, all of which factors can be varied to suit the requirements of a particular installation. It is to be understood that when the mechanism is operated at its rated speed, the lower ends of the arms 152 and 154 will be out of contact with the base plate at all times.

To facilitate starting, a clutch and flywheel will be preferably incorporated in the drive train. This shaker table drive mechanism is capable of handling extremely large loads and since it operates with substantially perfect elasticity, it absorbs very little power.

FIGURES 5 and 6 to which detailed reference will now be made illustrate the utilization of the planetary mechanism of the present invention as the drive mechanism for an ultra-sonic cleaner. In this form of the invention the planetary drive mechanism is enclosed in a main housing member 170 to which a cover plate 172 is attached as by screws 174. The rigid sun member 176 may be formed integrally with the drive shaft 178 mounted for rotation coaxially of the housing member 170 and cover plate 172 on bearings 180 and 182, the former being supported on a boss 184 formed integrally with housing member 170 and the latter being supported on a flange 186 formed integrally with the cover plate 172. To decrease the power requirements and to promote smoothness and stability of operation, a flywheel 188 is splined to the drive shaft 178 and is received in the space provided by the cover member 172.

The outer cam ring 190 is formed integrally with the main housing 170 and is separated from the rigid housing portions by thin-walled skirts 192 and 194.

The solid cylindrical planets 196 are supported for free rotation in the annular space between the sun member 176 and the ring portion 190 in a cage indicated generally at 198 which is similar to the conventional roller bearing cage. The cage 198 comprises an essentially cylindrical body portion having end flanges 202 and 204 which engage the opposite sides of the heavy ring portion 190 to prevent undue axial travel of the cage. The cage is provided with a plurality of radial slots 206 in which the plants 196 are loosely received. Formed integrally with the main body portion of the cage are discontinuous ridges 208 and 210, the thickness of the body portion through the ridges being slightly less than the space between the inner surface of the cam ring 190 and the outer surface of the sun member 176 to permit free travel of the cage while preventing undue radial motion. Sealingly secured to the main housing member 170 as by a plurality of bolts 212 is a container 214 which may be filled with any suitable fluid, for example water.

As in the embodiment of FIGURE 4, the inner surface of the outer ring 190 is formed with a plurality of symmetrical cams, the number and circumferential spacing of which corresponds to the number and circumferential spacing of the planets 196. In operation the container 214 is filled with a liquid such as water in which the articles to be cleaned are immersed and the drive shaft 178 is driven by any suitable power source (not shown). As the drive shaft rotates, vibrations of an ultrasonic frequency are generated in the ring 190 which establish ultrasonic wave motion in the surrounding body of liquid, which, as is well known in the art, are effective to loosen and remove dirt from the articles to be cleaned. Because of the utilization of the thin-walled skirts 192 and 194, the induced vibrations are confined largely to the relatively heavy ring portion 190 and are not transmitted to the remainder of the mechanism. In a typical case the shaft 178 will be driven at a speed in the neighborhood of 100,000 r.p.m. When the shaft is driven at this speed and some 24 planets 196 are utilized, vibrations well into the ultrasonic range (40,000 cycles per second) will be induced in the surrounding fluid body. It must be observed that the maximum frequency that can be induced in the heavy ring portion 190 equals its natural frequency when swinging in its basic radial mode. This is a function of its diameter, wall thickness, modulus of elasticity, and mass density. For example, the maximum frequency ($f$) in cycles per second for a steel ring of a suitable wall thickness having an outer diameter of D inches is given by the formula:

$$f = \frac{51500}{D}$$

Thus, in the above example the outer diameter of the cam ring must not exceed 1.29 inches for a 40,000 c.p.s. frequency.

The mechanism of FIGURES 5 and 6 may be adapted for use as a sound generator for directed energy by adding to the housing 170 a fairing 216 of paraboloid form and substituting for the container 214 an exponential horn 218 of well-known form as shown in FIGURE 7. The main drive mechanism may otherwise be of the same form as that shown in FIGURES 5 and 6. However it may be driven at a speed such that the vibrations induced in the air within the horn 218 will be in the range of audible sound.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A planetary stop and torque overload release mechanism comprising a housing, a sun member mounted for rotation in said housing, a ring member mounted in said housing in surrounding relation to said sun member, said sun member being mounted for limited radial floating movement, a spider in said housing, a plurality of planets rotatably supported on said spider and received in the annular space between said sun member and said surrounding ring, said surrounding ring having a plurality of cam surfaces engageable by said planets, each of said cam surfaces having a peak on the opposite sides of which are cam rises, said ring being deflectable to permit said planets to pass over said peaks, and opposed spring means operably connected to said housing and to side spider for yieldably urging said planets toward said cam peaks.

2. A planetary stop and torque overload release mechanism comprising a housing, a sun member mounted for rotation in said housing, a ring member mounted in said housing in surrounding relation to said sun member, said sun member and said ring member each being mounted for limited radial floating movement with respect to said housing, a spider in said housing, a plurality of stub shafts carried by said spider, a plurality of planets, yieldable means rotatably supporting said planets on said stub shafts for rotation in the annular space between said sun member and said surrounding ring member, said surrounding ring member having a plurality of cam surfaces engageable by said planets, each of said cam surfaces having a peak on the opposite sides of which are cam rises, said ring being deflectable to permit said planets to pass over said peaks, first spring means operably connected to said spider and to said housing for yieldably urging said planets in one direction toward said cam peaks, and second spring means operably connected to said spider and to said housing for yieldably urging said planets in the opposite direction toward said cam peaks.

References Cited by the Examiner

UNITED STATES PATENTS

| | | | |
|---|---|---|---|
| 2,042,235 | 5/36 | Misiak | 192—56 X |
| 2,065,244 | 12/36 | Richards | 192—56 |
| 2,668,426 | 2/54 | Hoover | 64—29 |
| 2,771,804 | 11/56 | Better et al. | 192—56 X |
| 2,775,326 | 12/56 | Better et al. | 64—29 |
| 2,791,304 | 5/57 | Better et al. | 192—56 |
| 2,819,635 | 1/58 | Better et al. | 192—56 X |
| 2,943,513 | 7/60 | Musser | 74—640 |
| 2,973,848 | 3/61 | Dixon | 192—56 |
| 2,977,809 | 4/61 | Becker et al. | 74—87 |
| 2,999,393 | 9/61 | Peterson | 74—87 |
| 3,002,731 | 10/61 | Gelfand et al. | 259—1 |
| 3,005,358 | 10/61 | Musser | 74—640 |
| 3,026,093 | 3/62 | Haan et al. | 259—1 |
| 3,026,733 | 3/62 | Carlson | 74—87 |
| 3,060,767 | 10/62 | Parrett | 74—798 |

FOREIGN PATENTS

| | | |
|---|---|---|
| 348,634 | 2/22 | Germany. |
| 773,658 | 5/57 | Great Britain. |

BROUGHTON G. DURHAM, *Primary Examiner.*

JAMES S. SHANK, BROUGHTON G. DURHAM,
*Examiners.*